United States Patent [19]

Clark

[11] Patent Number: 4,567,619

[45] Date of Patent: Feb. 4, 1986

[54] ADJUSTABLE LENGTH CLOTH PAD

[76] Inventor: Gaylord J. Clark, 4769 Paw Paw Lake Rd., Coloma, Mich. 49038

[21] Appl. No.: 599,407

[22] Filed: Apr. 12, 1984

[51] Int. Cl.⁴ .............................................. G60S 3/06
[52] U.S. Cl. ............................... 15/97 B; 15/DIG. 2; 15/230.16; 15/230.19; 51/334
[58] Field of Search ................... 15/97 B, 230, 230.14, 15/230.16, 230.17, 230.19, 183, 194, 195, 199, 204, 205; 51/334, 337

[56] References Cited

U.S. PATENT DOCUMENTS

| | | | |
|---|---|---|---|
| 1,685,406 | 9/1928 | Kimman | 15/230.16 |
| 2,194,577 | 3/1940 | Vonnegut | |
| 2,854,798 | 10/1958 | De Haven | |
| 3,869,833 | 3/1975 | Belanger | |
| 4,018,014 | 4/1977 | Belanger | 15/230.19 |
| 4,104,756 | 8/1978 | Gasser et al. | 15/230.16 |
| 4,377,878 | 3/1983 | Pecora | |

FOREIGN PATENT DOCUMENTS 117489  7/1918  United Kingdom .................. 15/205

*Primary Examiner*—Edward L. Roberts
*Attorney, Agent, or Firm*—Flynn, Thiel, Boutell & Tanis

[57] ABSTRACT

A vehicle finishing apparatus having a rotary drum provided with a plurality of flexible finishing units removably secured around the periphery thereof. The finishing units comprise enlarged cloth pads having a plurality of substantially parallel mounting portions formed integrally of the pad adjacent the inner edge thereof, each mounting portion, which is preferably formed by deforming the pad to create a closed loop, is adapted to be removably positioned within an outwardly opening groove formed on the periphery of the drum and extending lengthwise thereof. The different loops are progressively positioned in the mounting groove as the outer edge of the pad becomes worn so as to adjust the pad length.

16 Claims, 7 Drawing Figures

U.S. Patent  Feb. 4, 1986  Sheet 1 of 2  4,567,619
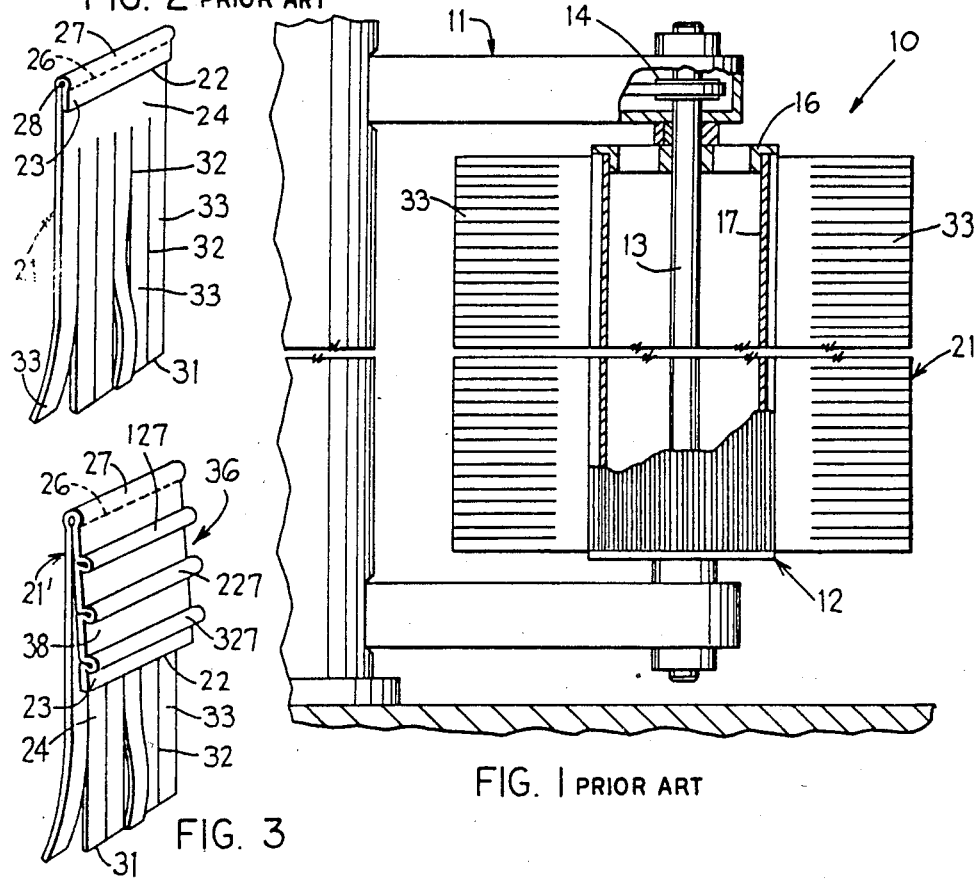
FIG. 2 PRIOR ART
FIG. 1 PRIOR ART
FIG. 3
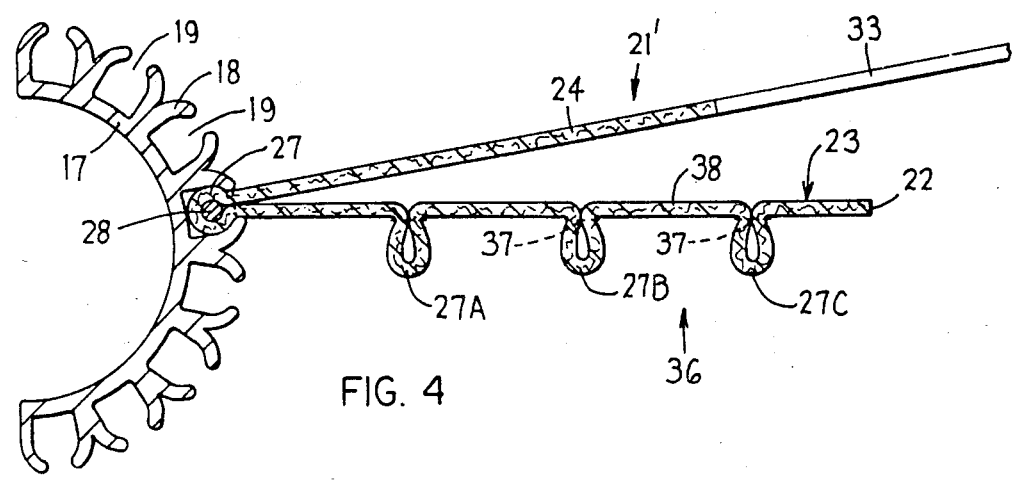
FIG. 4

ADJUSTABLE LENGTH CLOTH PAD

FIELD OF THE INVENTION

This invention relates to a vehicle finishing apparatus and, more particularly, to an improved finishing element, specifically a finishing cloth or pad, which is of adjustable length.

BACKGROUND OF THE INVENTION

Finishing devices such as car finishing brushes and polishing or buffing devices are extensively utilized in automatic car and truck finishing machinery of the type wherein remotely or automatically controlled equipment is used to wash, wax, polish or buff the surface of the vehicle. Conventionally, these finishing devices include a drum biased toward the vehicle, which drum rotates to cause finishing elements on the drum to wash, dry, polish or otherwise contact the vehicle's surface.

For many years these finishing drums have constituted brushes in that the drum was provided with a plurality of elongated flexible brush bristles, such as flexible plastic filaments, for finishing contact with the vehicle surface. However, many of the finishing devices have now eliminated the use of bristles, and in place thereof have substituted finishing elements formed from flexible cloth pads. In a finishing device of this type, the drum is provided with conventional mounting slots extending longitudinally along the periphery thereof, and each slot generally mounts therein a single finishing pad which is provided with an integral loop along one edge thereof. This loop has a suitable shaft or rod positioned therein so that the loop can be retained within the groove on the drum. The pad has a large number of parallel slits which project inwardly from the free edge of the pad so as to form a plurality of elongated flexible strips which effectively contact the vehicle surface to perform the desired finishing operation.

While the use of finishing elements formed as cloth pads has proven highly desirable with respect to the quality of the finishing operation which is performed, and also minimizes any undesirable marring of the vehicle surface, nevertheless these pads do experience substantial wear. In particular, the free ends of the flexible strips experience substantial wear due to their repetitive contact with the surfaces of vehicles, which wear ultimately causes several inches of the strip to tear off of the free end thereof. When this happens, then the strips no longer have sufficient length to achieve the desired finishing contact with the vehicle surface. Hence, this requires that the vehicle finishing apparatus be shut down and the finishing device disassembled to permit new finishing pads to be mounted on the drum. Of most significance, however, is the fact that the entire pad must be replaced even though only a few inches are worn off from the free ends of the strips. Since such pads are of substantial size, they are hence relatively expensive and thus significantly increase the cost of maintaining and operating such apparatus. For this reason, operators hence tend to utilize worn pads for longer periods of time than is desired, and this in turn results in a decrease in the efficiency of the finishing apparatus.

Accordingly, it is an object of this invention to provide an improved finishing element, specifically a finishing element formed as a cloth pad, which can be readily adjusted in length to compensate for wear and hence overcome the disadvantages associated with prior devices of this type.

More specifically, this invention relates to a finishing apparatus for finishing a vehicle surface, wherein there is provided a movable support, such as a rotatable drum, having a plurality of flexible finishing elements mounted on and projecting outwardly from the periphery thereof. Each finishing element comprises a flexible cloth pad having a mounting portion adjacent one end thereof for securement to the support, which mounting portion preferably comprises a rod-containing loop positionable within an axially elongated mounting groove formed on the support. The pad, adjacent the one end, is provided with a plurality of mounting portions, such as a plurality of loops, which are disposed in spaced but parallel relationship. The innermost of the loops is initially positioned in the groove to provide a pad having the desired length. As the free end of the pad wears, this innermost loop is removed from the groove and the next loop positioned within the groove so that the length of the pad is increased to compensate for wear. If desired, the stitching or staples which create the inner loop can be removed so as to release the loop from the pad, and hence permit removal of the rod, which rod itself can be utilized in the loop which is positionable in the groove. Alternately, each loop can have its own rod initially stitched therein if desired. Hence, the service life of the pad can be significantly increased by providing the pad with three or four mounting loops to permit compensation for wear at the free ends of the strips. At the same time, the amount of material required to initially form the pad is only slightly increased so as to provide the additional mounting loops.

Other objects and purposes of the invention will be apparent to persons familiar with apparatus of this general type upon reading the following specification and inspecting the accompanying drawings.

BRIEF DESCRIPTION OF THE DRAWINGS

FIG. 1 is a side elevational view, partially cut away, of a vehicle finishing device having a conventional finishing element mounted thereon.

FIG. 2 is a fragmentary perspective view of a conventional finishing element formed from a cloth pad.

FIG. 3 is a fragmentary perspective view similar to FIG. 2 but illustrating the improved finishing element of this invention.

FIG. 4 is an enlarged, fragmentary sectional view illustrating the improved finishing element of this invention as mounted on the drum.

Figure 5:
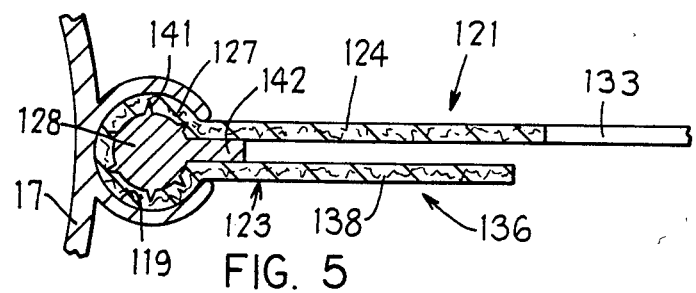
FIG. 5 is a fragmentary sectional view similar to FIG. 4 but illustrating a variation of the invention.

Certain terminology will be used in the following description for convenience in reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the apparatus and parts thereof. Said terminology will include the words specifically mentioned, derivatives thereof, and words of similar import.

DETAILED DESCRIPTION

FIG. 1 illustrates a portion of a vehicle finishing apparatus 10 which includes a mechanism 11 for biasing a vehicle finishing device 12 against the surface of a vehicle (not shown) to effect finishing of the surface, such as washing, buffing, polishing or drying of the surface. The finishing device 12 is secured to an axle 13 which is rotatably supported on and extends between the arms which form a part of the mechanism 11. This axle 13 in turn is driven by a conventional drive mechanism 14 so as to effect rotation of the finishing device 12 about the axis of the axle 13.

The finishing device 12 comprises a movable support which, in the illustrated embodiment, is a conventional cylindrical drum 16 which surrounds and is releasably coupled to the axle 13 so as to be rotatably driven thereby. This drum 16 has an annular peripheral wall 17 which, on the outer periphery thereof, has a plurality of axially elongated ribs 18 projecting outwardly therefrom. These ribs 18 define a plurality of elongated grooves 19 which extend axially throughout the length of the drum. These grooves 19 have the lower ends thereof closed by a suitable flange associated with the lower end hub of the drum. The grooves 19, which are disposed in closely adjacent but parallel relationship around the complete periphery of the drum, open outwardly but have a reduced width or throat at the radially outer end thereof so as to permit mounting of flexible finishing units 21 on the drum.

A conventional finishing unit 21 is illustrated in FIG. 2, which unit is of the cloth pad type and, in the illustrated embodiment, is of a one-ply thickness. This finishing unit 21 has one edge 22 thereof folded over so as to form a short tab portion 23 which overlaps the main pad portion 24. These two portions 23 and 24 are suitably secured together, such as by stitching or staples 26, so as to form a mounting portion 27, specifically a loop, which extends throughout substantially the complete length of the pad 21. A rigid shaft or rod 28 is positionable within the loop 27. This shaft-containing loop 27 is then positioned within one of the slots 19, such as by being slidably inserted into the slot from the upper end thereof.

The finishing pad 21, when mounted on the drum 16, has the main pad portion 24 disposed so as to project radially outwardly from the drum, particularly when the drum is rotated. To enable the main pad portion 24 to effect the desired finishing contact with the vehicle surface, and at the same time conform to the irregularities of the vehicle surface, the pad 21 is preferably provided with a plurality of elongated cuts or slits 32 which project inwardly from the free edge 31 so as to result in the formation of a plurality of elongated flexible strips 33. These slits 32 normally terminate at a distance of several inches from the mounting loop 27.

The vehicle finishing apparatus as hereinabove described, and in particular the structure of the finishing pad illustrated by FIG. 2 and the mounting thereof on a rotatable drum, is well known.

Considering now the present invention, and referring specifically to FIGS. 3 and 4, there is illustrated an improved finishing cloth pad 21' which permits the length of the pad to be selectively adjusted to compensate for wear. This improved pad 21' is identical to the pad 21 of FIG. 2 except that the tab portion 23 is enlarged so as to provide multiple drum mounting portions thereon.

More specifically, as illustrated by FIG. 3, this tab portion 23 is extended to provide a greater overlap with the main pad portion 24. This tab portion 23 in turn has means 36 associated therewith so as to permit the length of the pad, when mounted on the drum, to be adjusted so as to compensate for wear. This length adjusting means 36 includes additional drum mounting portions such as additional loops 27A, 27B and 27C. These latter loops are identical to the main loop 27 and are effectively formed by means such as removable stitching or staples 37. All of the loops 27, 27A, 27B, 27C extend substantially throughout the length of the pad in approximately parallel relationship, and are suitably spaced apart by an intermediate planar pad portion 38 so that the loops are spaced several inches apart. Each of these loops 27, 27A, 27B, 27C is adapted to have a shaft or rod 28 positioned therein. For example, a single rod 28 can be utilized and moved from loop to loop, or alternately each of the loops can have its own individual rod 28 positioned therein.

In utilization of the finishing apparatus, the improved pad 21' is normally mounted on the drum with the innermost loop 27 retained within the drum groove 19. However, after the free ends of the strips 33 become sufficiently worn so as to effect undesirable shortening of the pad, then the loop 27 is removed from the drum groove and the next loop 27A slidably inserted into the groove to effect lengthening of the main pad portion 24 so as to compensate for wear.

After the loop 27 has been removed from the drum groove 19, then the securing means such as the stitching or staples 26 can be removed so as to open up the loop and permit removal of the rod 28. If the next loop 27A is not initially provided with a rod therein, then the rod 28 from the loop 27 is inserted into the loop 27A so as to permit securement of this latter loop within the respective groove 19. On the other hand, if each of the loops is initially provided with its own rod 28 securely held therein, then the rod 28 removed from the loop 27 can be discarded.

After the pad undergoes additional wear so as to effect undesired shortening thereof, then the same procedure is followed with respect to the remaining loops 27B and 27C so as to effectively adjust the length of the main pad portion 24 so as to compensate for wear.

Hence, providing the pad 21' with the three additional mounting loops thereon hence enables the life of the pad to be effectively quadrupled. At the same time, the pad is of only minimal additional expense to produce since it requires only a minimal percentage increase in material so as to permit formation of the adjustable length means 36 illustrated by FIG. 4.

Figure 6:
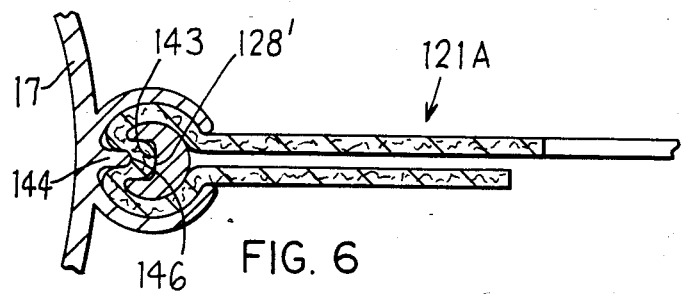
FIGS. 6 and 7 are views similar to FIG. 5 and illustrating still further variations.
Figure 7:
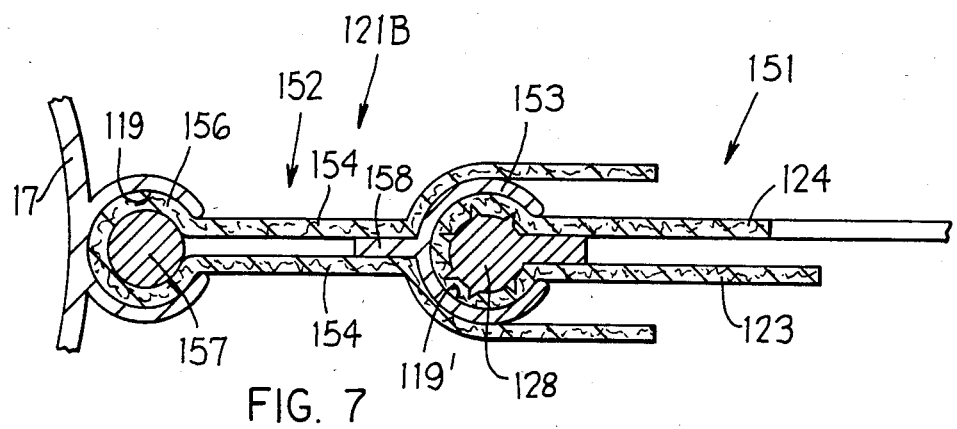

The variations illustrated in FIGS. 5–7 will now be considered.

Referring first to FIG. 5, same is similar to FIG. 4 in that a pad 121 is mounted on the drum wall 17 in such fashion as to be adjustable in length to compensate for wear. This pad 121 includes a main pad portion 124 having slits projecting inwardly from the free edge thereof to result in formation of a plurality of elongated flexible strips 133. This main pad portion connects to a loop portion 127 which is positionable within the drum groove 119 in surrounding relationship to a removable rod or shaft 128. The tab portion 123 of the pad is of substantial length and, in cooperation with the rod 128, effectively defines a means 136 for permitting the length of the main pad portion 124 to be adjustable to compensate for wear. To permit this adjustment in length, the rod 128 has a plurality of axially elongated barblike ribs 141 projecting outwardly therefrom in circumferentially spaced relationship therearound. These ribs permit the cloth material of the pad to be wrapped around the rod 128 to form the loop 127, with the ribs 141 penetrating the material of the loop 127 to prevent the loop from rotating or sliding relative to the rod. In addition, the rod 128 has a protrusion 142 which is formed integrally therewith and protrudes outwardly between the pad portions 123 and 124 through the open mouth of the groove 119. This protrusion 142, coupled with the thickness of the pad portions 123 and 124, effectively prevents the rod 128 from rotating within the groove, and hence in combination with the ribs 141 creates a secure and stationary locking of the pad 121 in its desired position.

When the free ends of the strips 133 wear so as to require adjustment of the pad length, then this can be easily accomplished by axially slidably removing the rod 128, following which the cloth pad can be advanced circumferentially around the rod 128 to effect the desired lengthening of the main pad portion 124, which in turn results in a shortening of the tab portion 123. The pad is then pressed around the rod 128 to effectively cause penetration of the ribs 141 into the pad, and the rod and pad are then slid into the groove 119. With this arrangement, the extra length of the pad as provided by the tab portion 123 can be utilized with optimum efficiency since the adjustment in the length of the pad can be of any desired amount, and not only in selected increments, since the pad length can be adjusted by whatever amount desired to compensate for wear.

Referring now to FIG. 6, there is illustrated a pad embodiment 121A which is similar to FIG. 5 and hence corresponding reference numerals have been utilized therein. In this case, however, the center rod 128' has an enlarged recess 143 therein, which recess is preferably diametrically opposite the mouth of the groove 119. The peripheral drum wall 17 preferably has an outwardly projecting rib or protrusion 144 thereon which projects toward the recess 143, whereby the protrusion 144 projects into the recess 143 to hence result in the formation of a small inwardly directed or reverse locking loop 146 within the main pad loop 127. This hence effects a secure locking engagement of the pad between the rod 128' and the wall structure defining the groove. However, when adjustment is desired, the rod and pad can be removed, whereupon the pad can again be advanced any desired amount, and the rod and pad again inserted into the groove.

While FIG. 6 illustrates the groove 146 being formed in the rod and the projection 144 being formed on the drum wall, it will be appreciated that these positional relationships can be reversed if desired.

Referring now to FIG. 7, there is illustrated an adjustable pad or finishing unit 121B which includes an inner substantially permanent cloth unit 152 and an outer replaceable cloth unit 151 which is adjustable in length to compensate for wear. More specifically, the outer cloth unit 151 is identical to the cloth unit 121 of FIG. 5 as described above, except that the groove 119' of the unit 151 is formed within a separate arcuate member 153 which extends longitudinally in parallel relationship to the axis of the drum but is spaced radially outwardly from the drum wall 17. This groove member 153 is connected to the drum wall 17 through the inner pad unit 152.

This inner pad unit 152 includes pad portions 154 of substantial length which have a loop portion 156 formed substantially at the midpoint thereof, which loop portion in turn surrounds an elongated shaft or rod 157. This rod 157 and loop portion 156 are snugly accommodated within the groove 119 associated with the drum. The opposed pad portions 154 project outwardly from the groove 119 and are positioned on opposite sides of and are effectively secured, as by staples or the like, to a platelike protrusion 158 which is fixedly secured to and projects from the rear peripheral surface of the groove member 153, which projection 158 is substantially diametrically opposite from the mouth of the groove 119'. In this manner, the groove member 153 is flexibly connected to and supported from the drum. The pad portions 154, from their point of attachment to the projection 158, then wrap around opposite sides of the groove member 153 and project slightly therepast to provide additional padded protection therefor. This groove member 153 is preferably formed from a plastics material to minimize potential of vehicle damage.

With the arrangement of FIG. 7, wear of the outer pad portion 151 is adjusted in the same manner as explained with respect to FIG. 5 by removing the rod 128 and hence readjusting the position of the pad to lengthen the main pad portion 124 by shortening of the tab portion 123. However, since this rod 128 is now spaced radially outwardly a significant distance from the periphery of the drum, this permits the overall length and hence quantity of material in the pad 151 to be reduced such that, when same is adjusted for wear, a higher percentage of the pad material can be utilized or consumed, and the replacement pad requires a smaller quantity of material than does the pad illustrated by the FIGS. 5 and 6 embodiments. The inner pad portion 152 is not subjected to much wear, and hence for all practical purposes can be considered more or less permanent. This pad portion 152 can, however, be rather easily replaced if necessary by removing the rod 157 and detaching the pad from the groove member 153.

The material for the cloth pad is typically a nonwoven felt secured to a suitable substrate, such material being conventional, although other types of materials or flexible cloths can also be utilized.

In addition, while the pad is illustrated as being of a single ply, it will be appreciated that the pad could be of a multiple-ply construction merely by positioning one or more plies of material in overlying relationship to the main pad portion, with these additional plies being secured by stitching or the like. This type of multiple-ply construction is also conventional.

While the illustrated embodiment disclosed a rotatable drum as the support for the finishing units, it will be appreciated that the movable support (i.e. the drum) could assume other shapes, such as endless belts having individually mounted longitudinal cloth holding strips attached thereto.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a vehicle finishing apparatus having a support, means for moving the support along an endless path, and a plurality of finishing units mounted on said support in peripherally spaced relationship therearound, each said finishing unit including a thin sheetlike pad of flexible material having an outer free edge adapted to contact a vehicle, said pad having an inner edge positioned adjacent the periphery of the support, and mounting means cooperating between support and said pad for releasably securing said pad to said support, said mounting means including a first part fixedly associated with said pad adjacent said inner edge thereof and releasably engageable with a second part which is fixedly associated with the periphery of the drum, said second part comprising an elongated groove which opens ourwardly of said support and extends in the lengthwise direction thereof, the improvement comprising means fixedly associated with said pad for selectively varying the point of attachment thereof to said drum to vary the length of said pad which projects outwardly from said drum, said means including a plurality of identical said first parts fixedly associated with said pad, said first parts being disposed in substantially parallel but closely spaced relationship with one another, said first parts being positioned in the vicinity of said inner edge but progressively spaced therefrom, each said first part comprising a substantially closed loop which is formed from the material of said pad, said loop being secured in a closed configuration to accomodate a mounting rod therein, the loops defined by said plurality of first parts being sidewardly spaced apart and extending in substantially parallel relationship in a direction substantially parallel with said inner edge.

2. An apparatus according to claim 1, wherein said pad has a plurality of substantially parallel slits formed therein, said slits extending inwardly from said outer edge in substantially perpendicular relationship thereto, said slits terminating in spaced relationship from said loops.

3. An apparatus according to claim 1, wherein said plurality of loops includes a first said loop which extends parallel with and is spaced inwardly a small distance from said inner edge, a second said loop which is spaced inwardly a small distance from and extends substantially parallel with said first loop, and a third said loop which is spaced inwardly a small distance from and extends substantially parallel with said second loop, each of said loops being formed by deforming said pad to form a looplike configuration having abutting portions for closing off the loop, and means extending through the abutting portions of the pad for securing same together to hold said loop closed.

4. An apparatus according to claim 3, wherein said securing means comprises stitching or stapling means which can be removed so as to permit opening up of the loop.

5. An apparatus according to claim 1, wherein said support comprises a rotary drum.

6. In a vehicle finishing apparatus having a rotary support, and plurality of finishing units mounted on said support in sapced relationship therearound, each finishing unit including a thin sheetlike pad structure of flexible material having an outer free edge adapted to contact a vehicle, said pad structure having an inner edge positioned adjacent the periphery of the support, the improvement comprising mounting means cooperating between said support and said pad structure for releasably securing said pad structure to said support and for selectively varying the point of attachment thereof to said support to vary the length of said pad structure which projects outwardly from said support, said mounting means includes a plurality of identical first parts fixedly associated with said pad structure in substantially parallel but closely spaced relationship in the vicinity of said inner edge but progressively spaced therefrom, each said first part comprising a substantially closed loop with is formed from said pad structure and is secured in a closed configuration to accommodate a mounting rod therein.

7. An apparatus according to claim 6, wherein said mounting means includes a second part which comprises an elongated groove secured to and extending longitudinally of said support and which opens outwardly thereof, said groove accommodating therein one of said loops.

8. In a vehicle finishing apparatus having a rotary support, and a plurality of finishing units mounted on said support in sapced relationship therearound, each finishing unit including a thin sheetlike pad structure of flexible material having an outer free edge adapted to contact a vehicle, said pad structure having an inner edge positioned adjacent the periphery of the support, the improvement comprising mounting means cooperating between said support and said pad structure for releasably securing said pad structure to said support and for selectively varying the point of attachment thereof to said support to vary the length of said pad structure which projects outwardly from said support, said mounting means including means which is fixedly associated with said support and extends in the lengthwise direction thereof, said last-mentioned means defining therein an elongated groove which opens outwardly of the support and extends in a lengthwise direction thereof, said pad structure having a main pad portion which extends inwardly from one free edge of the pad structure, said pad structure also having a tab portion which extends inwardly from the other free edge thereof, said tab portion being of shorter length than said main pad portion, said pad structure being deformed to form a loop at a location spaced inwardly a substantial distance from said other free edge, said loop joining said main pad and tab portions together, said loop being positionable within said groove, and said mounting means including elongated rod means removably disposed in said groove within said loop for clampingly holding said loop within said groove, said rod means having means associated therewith for preventing rotation thereof within said groove and for preventing sliding of said pad structure relative to said rod means, said means including a projection formed on one of said groove-defining and rod means, and an opposed enlarged recess formed on the other groove-defining and rod means, said last-mentioned projection extending into said recess and effecting deformation of a part of the material defining said loop to lockingly clamp said material between said rod means and said groove-defining means.

9. In a vehicle finishing apparatus having a rotary support, and a plurality of finishing units mounted on said support in spaced relationship therearound, each finishing unit including a thin sheetlike pad of flexible material having an outer free edge adapted to contact a vehicle, said pad having an inner edge positioned adjacent the periphery of the support, the improvement comprising mounting means cooperating between said support and said pad for releasably securing said pad to said support and for selectively varying the point of attachment thereof to said support to vary the length of said pad which projects outwardly from said support, said mounting means including a first part fixedly associated with said support and defining a lengthwise-extending groove which opens outwardly, an inner thin sheetlike pad of flexible material having a loop portion positioned within said groove, said loop portion of said inner pad terminating in a pair of opposed pad portions which project outwardly of said groove, an elongated rod positioned in said loop portion within said groove for securing said inner pad to said support, an outer groove-forming member secured to and between said pad portions in the vicinity of the free ends thereof and defining a lengthwise-extending groove which opens outwardly, said first-mentioned pad having a loop formed therein intermediate the free edges thereof and positioned within said last-mentioned groove, and a securing rod removabley positioned within said last-mentioned loop and disposed within said groove for clamping said last-mentioned loop between said securing rod and said groove member.

10. A vehicle-finishing pad structure for releasable attachment within an axially elongated groove adjacent the surface of a rotary support associated with a vehicle finishing apparatus, said pad structure being of a thin and flexible sheetlike material, said pad structure having a main pad portion which extends inwardly from one free edge of the pad structure and of tab portion which extends inwardly from the other free edge thereof, said tab portion being a shorter length than said main pad portion, said pad structure having a mounting portion which extends said main and tab portions, said mounting portion being deformed to form a plurality of substantially identical closed loops which are formed from the material of the pad structure, said loops being secured in a closed configuration so as to accommodate a mounting rod therein, the loops defined by said plurality being siderwardly spaced apart and extending in substantially parallel relationship in a direction substantially parallel with said other edge, a selected one of said loops being adapted to be positioned within the groove of the rotaty support.

11. A pad structure according to claim 10, wherein said plurality of loops includes a first said loop which extends parallel with and is spaced inwardly a small distance from said other edge, a second said loop which is spaced inwardly a small distance from and extends substantially parallel with said first loop, and a third said loop which is spaced inwardly a samll distance from and extends substantially parallel with said second loop, each of said loop being formed by deforming the material of said pad structure to form a looplike configuration having abutting portions for closing off the loop, and means extending through the abutting portions for securing same together to hold said loop closed.

12. A pad structure according to claim 11, wherein said pad structure is made from a single sheet of clothlike material.

13. A pad structure according to claim 10, wherein said pad structure is made from a single sheet of clothlike material.

14. In a vehicle finishing apparatus having a rotary support, and a plurality of finishing units mounted on said support in spaced relationship therearound, each finishing unit including a thin sheetlike pad structure of flexible material having an outer free edge adapted to contact a vehicle, said pad structure having an inner edge positioned adjacent the periphery of the support, the improvement comprising mounting means cooperating between said support and said pad structure for releasably securing said pad structure to said support and for selectively varying the point of attachment thereof to said support to vary the length of said pad structure which projects outwardly from said support, said mounting means including means which is fixedly associated with said support and extends in the lengthwise direction thereof, said last-mentioned means defining therein an elongated groove which opens outwardly of the support and extends in a lengthwise direction thereof, said pad structure having a main pad portion which extends inwardly from said outer free edge of the pad structure, said pad structure also having a tab portion which extends inwardly from said inner edge thereof, said tab portion being of significantly shorter length than said main pad portion, said pad structure being deformed to form a loop at a location spaced inwardly a small distance from said inner edge, said loop joining said main pad and tab portions together, said loop being positionable within said groove, and said mounting means including elongated rod means removably disposed in said groove within said loop for clampingly holding said loop within said groove, said rod means having holding means associated therewith for preventing rotation thereof within said groove and for preventing sliding of said pad structure relative to said rod means, said rod means being removable from said groove to adjust the position of said loop and increase the length of said main pad portion to compensate for wear.

15. An apparatus according to claim 14, wherein said rod means includes a substantially cylindrical elongated rod, and said holding means includes a flange secured to and projecting outwardly from said rod between said main pad and tab portions through the mouth of said groove for preventing rotation of said rod relative to said groove, and said holding means also including barblike means fixed to and projecting radially outwardly of said rod for deforming the material of said pad structure to prevent sliding of the pad structure relative to the rod means.

16. An apparatus according to claim 14, wherein the rod means and the holding means associated therewith result in the rod means having a substantially noncircular cross-section for preventing rotation of the the rod means within the groove, and the rod means including a rib or projection which extends in the elongated direction of the rod means and projects radially therefrom for deforming the pad structure to prevent sliding thereof relative to said rod means.

* * * * *

UNITED STATES PATENT AND TRADEMARK OFFICE
CERTIFICATE OF CORRECTION

PATENT NO. : 4,567,619

DATED : February 4, 1986

INVENTOR(S) : Gaylord J. CLARK

It is certified that error appears in the above-identified patent and that said Letters Patent is hereby corrected as shown below:

Column 8, line 7; change "with" to ---which---.

Column 9, line 27; change "of" (second occurrence) to ---a---.

Column 9, line 29; change "a" to ---of---.

Column 9, line 31; after "extends" insert ---between---.

Column 9, line 48; change "samll" to ---small---.

Signed and Sealed this

First Day of July 1986

[SEAL]

*Attest:*

DONALD J. QUIGG

*Attesting Officer*   *Commissioner of Patents and Trademarks*